United States Patent [19]
Boylan et al.

[11] Patent Number: 5,327,333
[45] Date of Patent: Jul. 5, 1994

[54] PUSH PUSH DC-DC REDUCED/ZERO VOLTAGE SWITCHING CONVERTER WITH OFF-SET TAPPED SECONDARY WINDING

[75] Inventors: Jeffrey J. Boylan; Mark E. Jacobs, both of Dallas; Thomas P. Loftus, Jr., Mesquite; Allen F. Rozman, Richardson, all of Tex.

[73] Assignee: AT&T Bell Laboratories, Murray Hill, N.J.

[21] Appl. No.: 981,638

[22] Filed: Nov. 25, 1992

[51] Int. Cl.⁵ .................. H02M 1/14; H02M 3/335
[52] U.S. Cl. ............................ 363/21; 363/48
[58] Field of Search ............... 363/20, 21, 45–48; H02M 1/14, 3/335

[56] References Cited

U.S. PATENT DOCUMENTS

| | | | |
|---|---|---|---|
| 4,641,229 | 2/1987 | Easter | 363/21 |
| 5,038,263 | 8/1991 | Marrero et al. | 363/20 |
| 5,099,406 | 3/1992 | Harada et al. | 363/20 |
| 5,126,931 | 6/1992 | Jitaru | 363/21 |

FOREIGN PATENT DOCUMENTS

| | | | |
|---|---|---|---|
| 0508664 | 10/1992 | European Pat. Off. | H02M 3/337 |
| 59-153462 | 9/1984 | Japan | 363/21 |
| 1275690 | 12/1986 | U.S.S.R. | H02M 3/335 |

OTHER PUBLICATIONS

"Constant Frequency, Forward Converter with Resonant Transition", I. Jitaru, *HFPC Proceedings*, pp. 282–292.

"Zero Voltage PWM, Double Ended Converter" by I. D. Jitaru HFPC–May Proceedings, pp. 394–405, 1992.

*Primary Examiner*—William H. Beha, Jr.
*Attorney, Agent, or Firm*—A. G. Steinmetz

[57] ABSTRACT

A DC-DC converter utilizes a tapped transformer secondary winding as a means of achieving output voltage ripple cancellation. This ripple cancellation occurs at a specified input voltage. It operates by fixing the location of a tap on the secondary winding of the power transformer so that the output voltage ripple cancellation occurs at the specified input voltage. It also minimizes the volt seconds that must be sustained by the output filter inductor over a specified range of input voltage for the converter.

6 Claims, 3 Drawing Sheets

PUSH PUSH DC-DC REDUCED/ZERO VOLTAGE SWITCHING CONVERTER WITH OFF-SET TAPPED SECONDARY WINDING

FIELD OF THE INVENTION

This invention relates to DC-DC converters and in particular to a method and apparatus for reducing output voltage ripple. It is also concerned with reducing the size of output filter components needed for a given level of output voltage ripple and with reducing the response time of corrections to an output voltage in responding to transient load current changes.

BACKGROUND OF THE INVENTION

Ripple voltage must be reduced to an acceptable level to achieve satisfactory operation of DC-DC converters in a telecommunications or an EDP environment. Traditional means for reducing ripple have required large inductive and capacitive filter components that add bulk to the converter and are expensive, adding to the overall cost of the converter. Large filter components also result in slow transient response to changes in load current and input voltage.

SUMMARY OF THE INVENTION

A push push DC-DC converter, embodying the principles of the invention, utilizes an offset tapped transformer secondary winding as a means of achieving output voltage ripple cancellation. This ripple cancellation occurs at a specified input voltage. It operates by fixing a location of a tap included on the secondary winding of the power transformer so that a nearly constant voltage is supplied to the output filter at a specified input voltage. This advantageously minimizes the output voltage volt-seconds that must be sustained by the output filter inductor. The peak inverse voltages sustained by the output rectifying diodes are also significantly reduced by fixing the primary to secondary turns ratio of the transformer.

DETAILED DESCRIPTION

Figure 1:
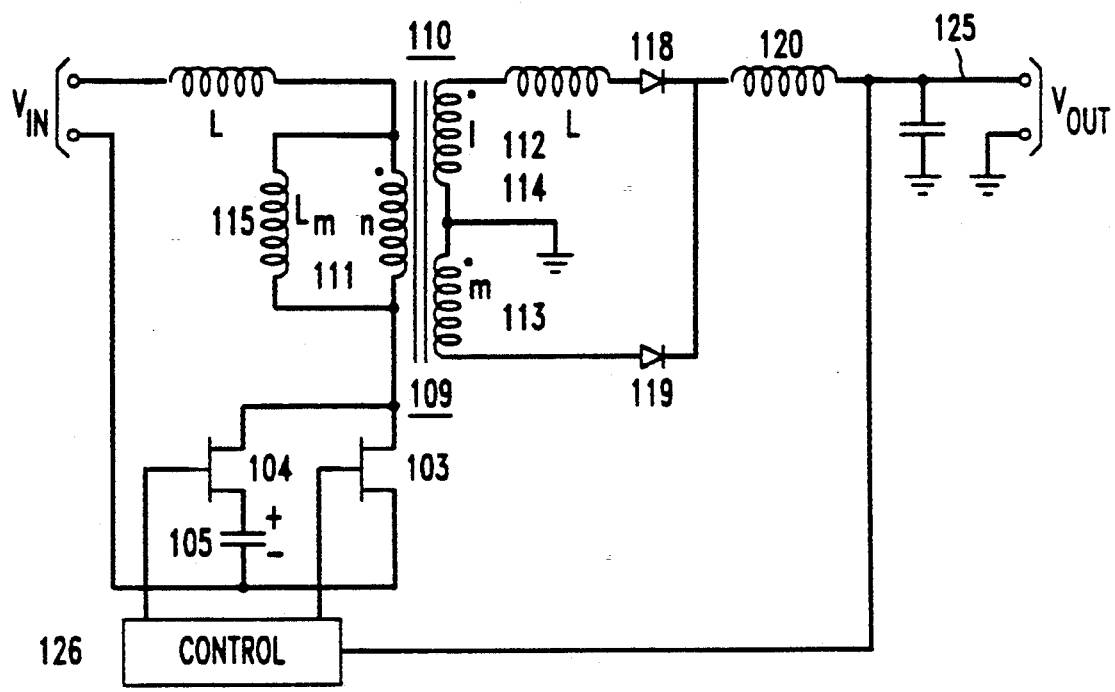
FIG. 1 is a schematic of a push push DC-DC Converter.

The converter circuit in FIG. 1, which is a buck-derived PWM converter topology, operates by alternately conducting current through a power switch FET 103 and a power switch FET 104. Power switch FET 103 conducts for a period of time described by a duty cycle D, and power switch FET 104 conducts for substantially most of the alternate interval (1−D). A brief dead-time may be interposed between the conduction intervals to achieve zero-voltage switching.

Figure 8:
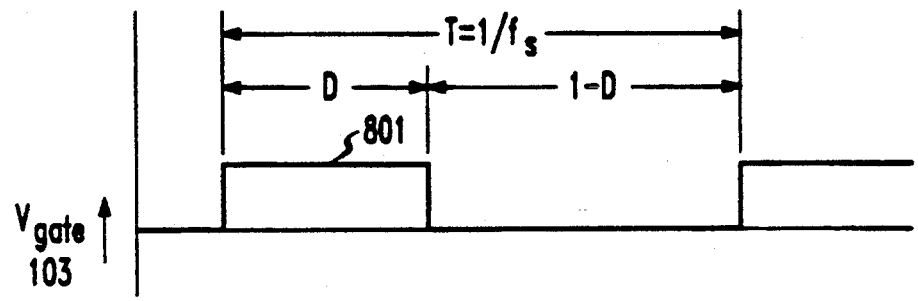
FIGS. 2 to 9 illustrate waveforms to assist in describing the operation of the circuit of FIG. 1.
Figure 9:
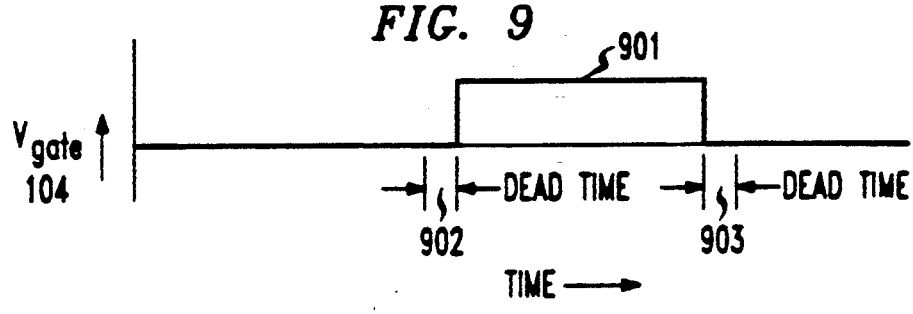

The gate drive signals for the power switch FETs 103 and 104 are shown in FIGS. 8 and 9, respectively. In FIG. 8 the gate drive signal 801 is a pulse signal having a time duration of "D". The gate drive signal 901 in FIG. 9, for power switch FET 104, occurs during a time interval "1−D" which includes the time interval of pulse 901 and the dead-time intervals 902 and 903 occurring at either end of that gate drive signal. The gate drive signals are supplied by the control circuit 126. Control circuit 126 senses the output voltage of the converter and compares it with a reference to generate an error voltage. The control voltage is utilized by the control circuit 126 to change the relative time duration of time intervals D and 1−D in order to adjust the output voltage to a regulated value.

A capacitor 105, connected in series with power switch FET 104, charges to a steady-state voltage of $V_{in}/(1-D)$, with polarity as shown in FIG. 1. This capacitor 105 insures that the average voltage impressed across the transformer primary winding is zero. This capacitor 105 temporarily stores the transformer magnetizing current during the first half of the 1−D portion of the switching cycle, and returns this energy to the transformer 110 during the second half. Flux balance in the transformer 110 is achieved because the average voltage applied to the primary winding 111 is zero.

The power transformer 110 includes a primary winding 111 connected to the power switch FETs 103 and 104 and a secondary winding 109, divided by a tap 114 into top and bottom winding segments 112 and 113. The transformer turns ratios, with respect to the primary winding 111 and the two winding segments 112 and 113 are related by n:1:m, respectively, where n:1 is the ratio of primary turns to the secondary turns of the top winding segment 112, and 1:m is the ratio of the secondary turns of the top winding segment 112 to the turns of the bottom winding segment 113.

The operation of the converter may be readily understood by those skilled in the art by reference to the following analytical expressions defining the operation of the converter as described below.

Figure 2:
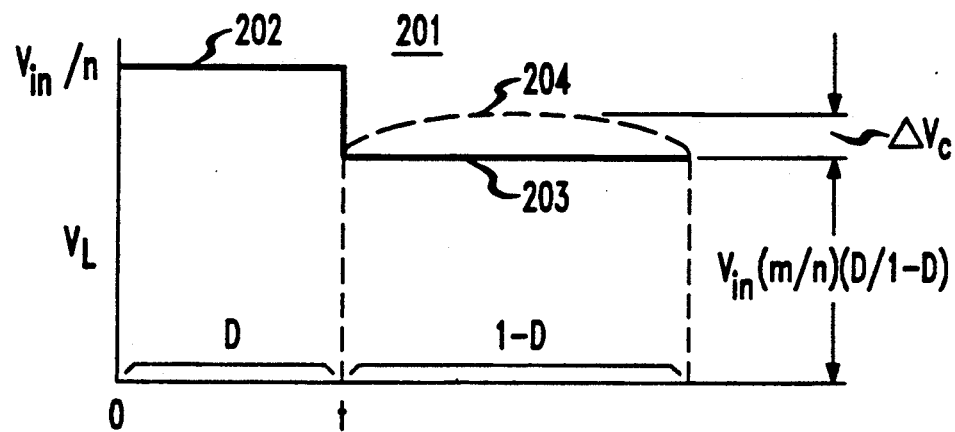

FIG. 2 shows a waveform 201 with solid line 202 representing the (idealized) voltage applied to the diode side of the output filter inductor 120. The waveform portion 203 of waveform 201 is associated with the (1−D) portion of the switching cycle and depends on the turns ratio 1:m; hence m is chosen to satisfy the equation $$(1-D) = m \cdot D \tag{1}$$

at the specified input voltage at which output ripple cancellation is desired.

The output voltage at the output terminal 125 (FIG. 1) is regulated and essentially constant, and with the transformer secondary tap fixed, as per equation (1), ripple cancellation may be achieved. In actuality, the part of the waveform 203 associated with the (1−D) portion of the switching cycle has a slight curvature as shown by the dashed line 204 in FIG. 2. This is due to charge accumulating on the capacitor 105. The capacitor voltage subtracts from the input voltage $V_{in}$ during the (1−D) portion of the switching cycle. The voltage change during the interval (1−D), measured at the diode side of the output inductor 120, is approximately defined as $$\Delta V_C \approx \frac{V_A \cdot V_B}{8 \cdot C_{105} \cdot f^2 \cdot L_{mag} \cdot (V_A + V_B)} \tag{2}$$

where f is the power supply switching frequency, and $L_{mag}$ is the transformer magnetizing inductance 115 referenced to the primary winding 111. $V_C$ is the capacitor 105 voltage; $V_A$ is the lowest $V_{in}$ and $V_B$ is the highest $V_{in}$ defining the operational range of the converter. With a capacitor 105 sufficiently large in capacitance to ignore the periodic voltage change $\Delta V_C$, the voltage represented by the waveform 201, as shown in FIG. 2, may be averaged to give a relationship between input and output voltages as expressed by:

$$V_0 = V_{in} \cdot D(1+m)/n \qquad (3)$$

Equation (3) indicates that as the duty cycle D is increased from 0 to 1, the output voltage increases linearly from 0 to a maximum value of $$V_0 = \frac{V_{in}(1+m)}{n} \qquad (4)$$

at D=1.0. Therefore, this push push converter circuit has the capability to operate over a range of duty cycle D that is symmetric about D=0.5. Other converter circuit topologies like a phase-shifted full bridge, for example, allow only a 50% variation in D.

An advantage of this push push power converter circuit is its ability to minimize the maximum output ripple voltage over the expected range of DC input voltages. In particular, the maximum value of volt-seconds applied to the output inductor 120 can be minimized by the proper choice of the turns ratio m, thereby minimizing the peak-to-peak variation in ripple current conducted through inductor 120:

$$\int_0^{D \cdot \Delta T} e_L dt = -\int_{D \cdot \Delta T}^{\Delta T} e_L dt = \frac{V_0}{f}\left[\frac{1}{m+1} - D\right] \qquad (5)$$

In Equation (5) above, f is the power supply switching frequency, and the duty cycle D selected implicitly depends on the input voltage.

The optimal value of m in Equation (5) which minimizes the maximum volt-seconds applied to L (inductor 120) is $$m = \frac{2}{D_A + D_B} - 1 \qquad (6)$$

where $D_A$ is the duty cycle sustaining the regulated output voltage at the lowest input voltage $V_A$, and $D_B$ is the duty cycle sustaining the regulated output voltage at the highest input voltage $V_B$.

If the power converter is operated over a range of duty cycles symmetric about D=0.5, i.e., where $D_A = 1 - D_B$, then $$m_{opt} = 1 \qquad (7)$$

because $D_A + D_B = 1.0$. Equation (7) indicates that the secondary should be selectively center-tapped to minimize the maximum output ripple. Equation (5), using the optimal value of m from Equation (6), gives $$\int e_L \cdot dt \leq \frac{V_0}{2 \cdot f} [D_A - D_B] \qquad (8)$$

for the volt-seconds applied to the output inductor 120. In Equation (8), the equality holds at the high or low input voltages $V_A$ or $V_B$; whenever Equation (1) is satisfied, then $$\int e_L dt = 0 \qquad (9)$$

e.g., there is output ripple cancellation when m=1 and D=0.5.

The optimum transformer turns ratio n is determined from Equation (3), recognizing that the peak-inverse voltage $PIV_1$ across output rectifier diode 118 is given by $$PIV_1 = \left(\frac{D}{1-D}\right) \cdot V_{in} \cdot \frac{(m+1)}{n} = \frac{V_0}{1-D} \qquad (10)$$

and the $PIV_2$ across diode 119 is given by $$PIV_2 = \left(\frac{1}{D}\right) \cdot V_{in} \cdot \left(\frac{m+1}{n}\right) = \frac{V_0}{D} \qquad (11)$$

Thus the maximum PIV across rectifier diode 118 occurs at minimum $V_{in}$, when D is largest:

$$\max\{PIV_1\} = \frac{V_0}{1-D_A} \qquad (12)$$

and the maximum PIV across rectifier diode 119 occurs at maximum $V_{in}$, when D is smallest:

$$\max\{PIV_2\} = \frac{V_0}{D_B} \qquad (13)$$

To minimize the maximum diode PIVs, means that $$\max\{PIV_2\} = \max\{PIV_1\} \qquad (14)$$

or $$\frac{V_0}{1-D_A} = \frac{V_0}{D_B} \qquad (15)$$

which is equivalent to $$1 - D_A = D_B \qquad (16)$$

Equation (16) shows that to minimize the rectifier diode PIVs, the minimum and maximum values of D are required to be symmetric about D=0.5.

The optimal transformer turns ratio is determined by using Equation (3).

$$\frac{V_0}{V_B} \cdot \left(\frac{n}{m+1}\right) = D_B = 1 - D_A = 1 - \frac{V_0}{V_A} \cdot \left(\frac{n}{m+1}\right) \qquad (17)$$

Thus, to minimize the maximum rectifier diode PIVs, it is required that $$\frac{m+1}{n} = \frac{V_0(V_A + V_B)}{V_A \cdot V_B} \qquad (18)$$

Equation (18) specifies the ratio of m+1 to n, while allowing the freedom to pick both m and the ratio (m+1)/n. Equation (18) in conjunction with Equation (1) implies that minimizing diode PIV and minimizing the maximum output ripple can be achieved independently, if desired.

Using Equations (3) and (18), the duty cycle $D_B$ at the highest input voltage $V_B$ is given by $$D_B = \frac{V_A}{V_A + V_B} \quad (19)$$

and from Equation (16), $$D_A = \frac{V_B}{V_A + V_B} \quad (20)$$

Equations (19) and (20) describe the allowable range of duty cycle to minimize the PIV of the output diodes. Equations (19) and (20) apply regardless of how m is chosen.

The worst-case (steady-state) PIV's of the two rectifying diodes 118 and 119 are given by Equations (12) and (13), hence:

$$PIV_1 = PIV_2 = \frac{V_0(V_A + V_B)}{V_A} \quad (21)$$

With the power converter designed to operate over a narrow range of input voltages, e.g., $V_B/V_A = 2$ where $D_A \approx 0.67$ and $D_B \approx 0.33$, then $V_{PIV1} = V_{PIV2} = 3 V_0$, which represents a highly desirable condition of very low diode peak-inverse voltage (PIV). For a wide-range design, e.g., $V_B/V_A = 7$, where $D_A \approx 0.87$ and $D_B \approx 0.13$, then $V_{PIV} = 8 V_0$. The factor of 8 in computing diode PIV is a low ratio compared with other converter topologies for a 7:1 input voltage range. For example, a phase-shifted full bridge requires a factor of 14. A low diode PIV is essential for achieving a high conversion efficiency. Therefore the push-push configuration, as shown in FIG. 1, and described above, achieves a high conversion efficiency, particularly at low output voltages (typically < 15 volts), where diode losses can be a significant component of total dissipation.

As described above, using a low-end secondary turns ratio of m=1 implies that output ripple cancellation occurs at D=0.5 (from Equation (1)). For a design achieving minimum diode PIV, i.e., when Equation (18) is satisfied, the duty cycle for any input voltage $V_{in}$ is given, using Equations (3) and (18), by $$D = \frac{V_A \cdot V_B}{V_{in}(V_A + V_B)} \quad (22)$$

The condition D=0.5 implies that output ripple cancellation occurs at $$V_{in} = \frac{2 \cdot V_A \cdot V_B}{V_A + V_B} \quad (23)$$

For some applications it may be more important that ripple cancellation occur at a specified input voltage $V_{in}$ rather than the input voltage given by Equation (23), at the penalty of a slightly larger output inductor, but at no penalty in output diode PIV. This is achieved by off-setting the secondary tap using the subsequent Equation (24).

$$m = \frac{V_{in}(V_A + V_B)}{V_A \cdot V_B} - 1 \quad (24)$$

which follows from Equations (1) and (22).

The maximum peak-inverse voltage sustained by either power switch FET 103 or 104 is the same as the maximum voltage sustained by the primary-side clamp capacitor 105 (in FIG. 1). The voltage on this capacitor 105 is defined by:

$$V_{in}/(1-D). \quad (25)$$

Using the value of D as given by Equation (15) for either extreme of the input voltage, i.e., $V_A$ or $V_B$, results in the maximum power switch FET (or capacitor) voltage of $$V_A + V_B \quad (26)$$

volts. The minimum power switch FET voltage is $$\frac{4 \cdot V_A \cdot V_B}{V_A + V_B} \quad (27)$$

and this occurs at $$V_{in} = \frac{2 \cdot V_A \cdot V_B}{V_A + V_B} \quad (28)$$

which is near the center of the input voltage range. Thus the utilization of a symmetric duty cycle range to minimize rectifier diode PIV, i.e., Equation (16), also advantageously minimizes the power switch FETs' PIV.

Figure 3:
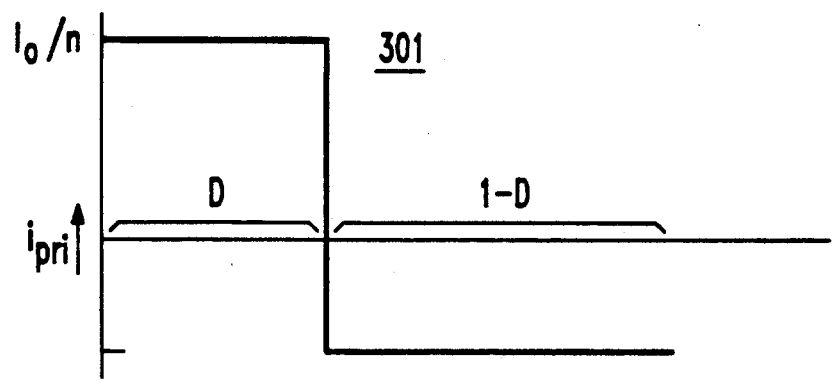

The component of current in the transformer primary due to the load current in the secondary is shown by the waveform 301 in FIG. 3; With the output current $I_0$, flowing through the output inductor 120, being essentially constant no net average current can flow through the transformer primary winding 111 when the power switch 103 is nonconducting, and a compensating DC current $I_{bias}$ flows through the magnetizing inductance 115 of the transformer 110.

$$I_{bias} = \frac{I_0 \cdot m}{n} \quad (29)$$

The magnetizing inductance 115 and the DC current $I_{bias}$ are connected across the transformer primary winding 111 as shown in FIG. 1.

Figure 4:
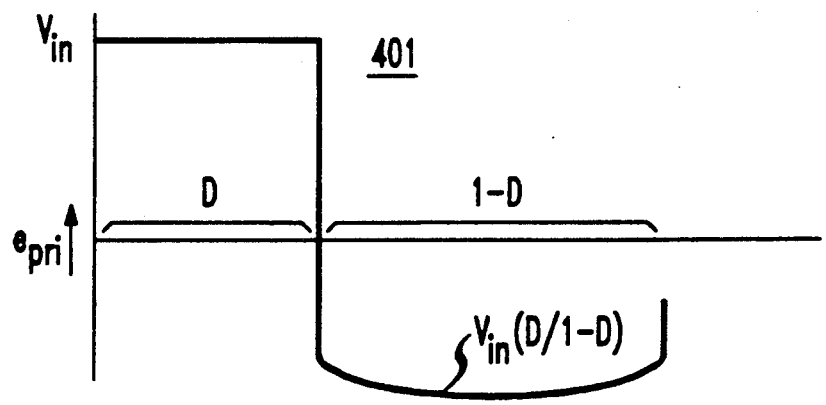

A third component of current that flows through the primary is that due to the volt-seconds applied to the primary winding 111 resulting from the switching action of the power switch FET 103 and the power switch FET 104. The voltage applied to the primary is shown as waveform 401 in FIG. 4. Since the period of this waveform 401 is $\Delta T = 1/f$, the volt-seconds sustained during either the D or 1−D portion of the cycle is $$\int e_p \cdot dt = D \cdot V_{in} = \frac{n \cdot V_0}{(m+1) \cdot f} = \frac{V_A \cdot V_B}{f \cdot (V_A + V_B)} \quad (30)$$

Figure 5:
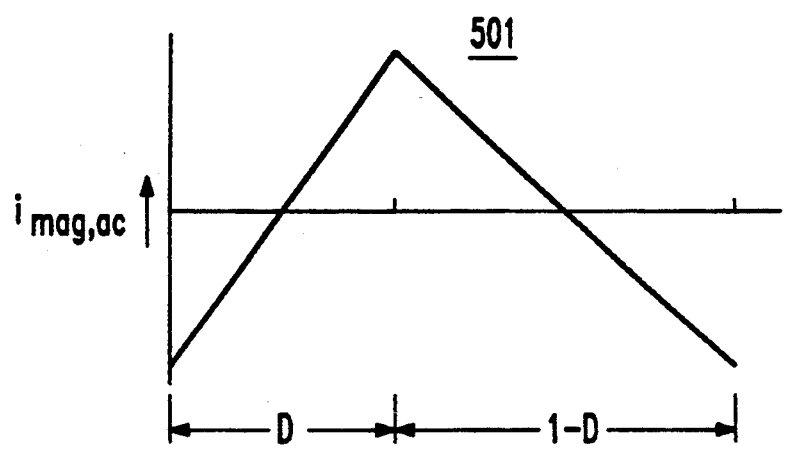

Using Equations (3) and (18), the resulting AC current through the (primary side) magnetizing inductance 115 is shown as waveform 501 in FIG. 5, and has a peak-to-peak magnitude of $$2 \cdot I_{mag} = \frac{V_A \cdot V_B}{L_{mag} \cdot f \cdot (V_A + V_B)} \quad (31)$$

The ferrite losses do not depend on the bottom winding segment secondary turns ratio m because the AC flux excursions, depending only on the volt-seconds applied to the primary winding 111, do not depend on m.

Figure 6:
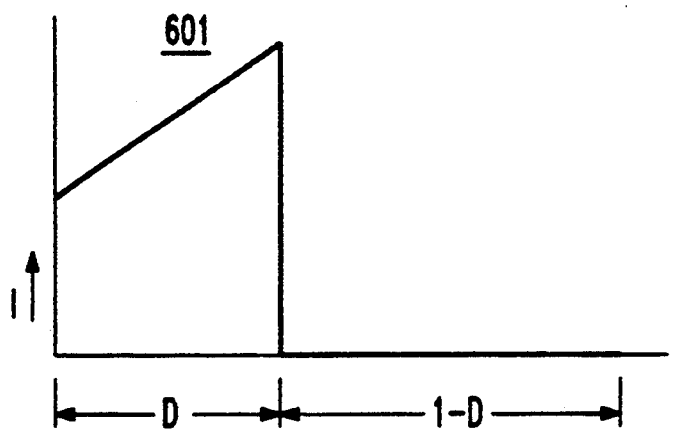
Figure 7:
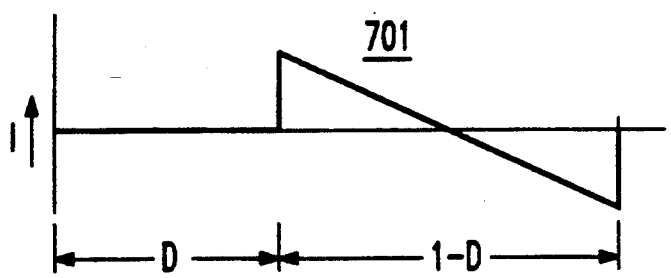

The net current flowing into the primary winding 111 is the sum of the three components above, i.e., the reflected secondary load current, the DC bias current, and the AC current in the magnetizing inductance. These waveforms 601 and 701 are plotted in FIGS. 6 and 7, respectively.

In general, it is possible to accommodate zero-voltage switching of power switch FET 104 with this circuit by biasing the power switch FET 103 nonconducting and then delaying the conduction of the power switch FET 104 by an appropriate time interval. The combination of the load current reflected to the primary winding 111 plus the magnetizing current in the transformer 110 assures the lossless transfer of charge in the power switch FETs' parasitic capacitances.

The push-push converter, with a tapped secondary, as described above, allows operation over a wide range of input voltages. Output ripple voltage is substantially reduced at a specified input voltage range $V_A$ to $V_B$ (with use of a multi-turn secondary winding), resulting in very quiet EMI performance at the nominal input voltage range. This arrangement also provides for low volt-seconds across the output inductor 120 over the specified input voltage range of the converter.

We claim:

1. A DC-DC converter comprising:
an input for accepting a dc voltage source;
a power transformer including a primary winding and a secondary winding;
a power switching device;
an output for accepting a load to be energized including an inductor and a capacitor for filtering ripple voltage;
first and second rectifying diodes connecting opposite ends of the secondary winding to the inductor and capacitor;
the secondary winding including a fixed tap to divide it into two secondary winding segments with a 1:m turns relation and with the relative turns of the two secondary winding segments determined by the relation, $$1 - D_A = D_B$$

where $D_A$ is a duty cycle sustaining a regulated output voltage at a lowest input voltage $V_A$ and $D_B$ is a duty cycle sustaining the regulated output voltage at a highest input voltage input voltage $V_B$
the primary winding having a relation of n:1 with the one designated secondary winding segment, and
the relation between a voltage at the input $V_{in}$ and a voltage at the output $V_{out}$ being governed by the expression, $$V_0 = V_{in} \cdot D(1+m)/n$$

wherein ripple voltage at a power output is minimized and ripple current in the inductor is minimized.

2. A DC-DC converter, comprising:
an input for accepting a dc voltage source with an expected range bounded by a low voltage limit $V_A$ and a high voltage limit $V_B$;
a power transformer including a primary winding and a secondary winding;
the secondary winding being tapped so that the secondary winding has a top and bottom winding segment with a relative turns ratio of n:1:m, where n:1 is the primary winding to top winding segment winding ratio and 1:m is the top winding segment to bottom winding segment winding ratio;
a first and second power switch;
circuitry to switch the first and second power switches to conduct alternately with a duty ratio of D:1−D, where a duty cycle $D_A$ maintains a desired output voltage when $V_A$ is the input voltage and a duty cycle $D_B$ maintains a desired output voltage when $V_B$ is the input voltage and selecting the value of m to satisfy the expression, $$m = \frac{2}{D_A + D_B} - 1$$

the first power switch connected to connect the primary winding to the input;
the second power switch connecting a storage capacitor to the primary winding;
an output for accepting a load to be energized including an inductor and a capacitor for filtering ripple voltage;
first and second rectifying diodes connecting opposite ends of the secondary winding to the inductor and capacitor;
the secondary winding including a fixed tap to divide it into two winding segments with the relative turns of the two winding segments determined by the relation $$m = \frac{2}{D_A + D_B} - 1$$

and the values for m and n are further related by the expression;

$$\frac{m+1}{n} = \frac{V_0(V_A + V_B)}{V_A \cdot V_B}$$

resulting in the duty cycle conforming to the expression, $$1 - D_A = D_B$$

wherein both the output ripple voltage and reverse voltages applied to the first and second rectifying diodes are advantageously limited.

3. A DC-DC converter, comprising:
an input for accepting a dc voltage source with an expected range bounded by a low voltage limit $V_A$ and a high voltage limit $V_b$;
a power transformer including a primary winding and a secondary winding;
the secondary winding being tapped so that the secondary winding has a top and bottom winding segment with a relative turns ratio of n:1:m, where n:1 is the primary to top winding segment winding ratio and 1:m is the top winding segment to bottom winding segment winding ratio;
a first and second power switch;
circuitry to switch the first and second power switches to conduct alternately with a duty ratio of D:1−D, where a duty cycle $D_A$ maintains a desired output voltage when $V_A$ is the input voltage and a duty cycle $D_B$ maintains a desired output voltage when $V_B$ is the input voltage and selecting the value of m to satisfy the expression, $$m = \frac{2}{D_A + D_B} - 1$$

the first power switch connecting the primary winding to the input;

the second power switch connecting a storage capacitor to the primary winding;

an output for accepting a load to be energized including an inductor or a capacitor for filtering ripple voltage;

first and second rectifying diodes connecting opposite ends of the secondary winding to the inductor and capacitor;

the secondary winding including a fixed tap to divide it into two winding segments with the relative turns of the two winding segments determined by the relation $$m = \frac{2}{D_A + D_B} - 1$$

and the values for m and n are further related by the expression;

$$\frac{m+1}{n} = \frac{V_0 (V_A + V_B)}{V_A \cdot V_B}$$

resulting in the duty cycle conforming to the expression, $$1 - D_A = D_B$$

wherein both the output ripple voltage and reverse voltages applied to the first and second rectifying diodes are advantageously limited.

4. A DC-DC converter comprising:
an input for accepting a DC voltage,
a power transformer,
power switching circuitry coupling the input to the power transformer including alternately conducting first and second power switches in series with a primary winding of the power transformer,
an output for accepting a load,
rectifying circuitry connected to a secondary winding of the power transformer and including alternately conducting first and second rectifying diodes, and
filter circuitry including a filter inductor connecting the rectifying circuitry to the output;
the improvement comprising:
power switch drive circuitry connected for driving the first and second power switches with a duty cycle ratio having symmetry about a mid point duty cycle to minimize peak inverse voltages across the first and second rectifying diodes;
the power switch drive circuitry connected for driving the first and second power switches to conduct alternately with a duty ratio $D:1-D$, where a duty cycle $D_A$ maintains a desired output voltage when $V_A$ is the input voltage and a duty cycle $D_B$ maintains a desired output voltage when $V_B$ is the input voltage and selecting the value of m to satisfy the expression, $$m = \frac{2}{D_A + D_B} - 1$$

a secondary winding of the power transformer having a fixed tap so that the secondary winding has a top and bottom winding segment with a relative turns ratio of n:1:m, where n:1 is the primary to top winding segment ratio and 1:m is the top winding segment to bottom winding segment winding ratio, the secondary winding with the fixed tap is divided into two winding segments with the relative turns of the two winding segments determined by the relation $$m = \frac{2}{D_A + D_B} - 1$$

the power switch drive circuitry further driving the power switches with a duty cycle further conforming to the expression, $$1 - D_A = D_B$$

and relating the values of m and n according to $$\frac{m+1}{n} = \frac{V_0 (V_A + V_B)}{V_A \cdot V_B}$$

so that the output ripple voltage and reverse voltages applied to the first and second rectifying diodes are advantageously limited, and so that in response to a specified input voltage applied to the input a substantially constant voltage is applied to the filter inductor at the specified input voltage whereby the volt-seconds sustained by the filter inductor is minimized.

5. A DC-DC converter, comprising:
an input for accepting a dc voltage source;
a power transformer including a primary winding and a secondary winding;
a first and second power switch;
circuitry to switch the first and second power switches to conduct alternately at a duty cycle ratio $D:(1-D)$ with a dead time interval occurring between alternate conducting intervals;
the first power switch connected to connect the primary winding to the input;
the second power switch connecting a storage capacitor to the primary winding;
an output for accepting a load to be energized including an inductor and a capacitor for filtering ripple voltage;
first and second rectifying diodes connecting opposite ends of the secondary winding to the inductor and capacitor;
the secondary winding including a fixed tap to divide it into two winding segments having a 1:m relative winding ratio with the relative turns of the two winding segments determined by the relation $$(1-D) = m \cdot D$$

and is further dependent on a ratio of a voltage at the input to a voltage at the output in order to minimize ripple voltage at a specified voltage at the input;

whereby a turns ratio of the primary to secondary winding is further selected in accordance with the relationship $$\frac{m+1}{n} = \frac{V_0(V_A + V_B)}{V_A \cdot V_B}$$

where $D_A$ is a duty cycle sustaining a regulated output at a lowest input voltage $V_A$ and $D_B$ is a duty cycle sustaining the regulated output voltage at a highest input voltage $V_B$ and being operative for limiting the peak inverse voltage across the rectifying diodes that must be sustained over the range of input voltage for which the converter is rated.

6. A DC-DC converter, comprising:

an input for accepting a dc voltage source;

a power transformer including a primary winding and a secondary winding;

a first and second power switch;

circuitry to switch the first and second power switches to conduct alternately, the first power switch connected to connect the primary winding to the input;

the second power switch connecting a storage capacitor to the primary winding;

an output for accepting a load to be energized including an inductor and a capacitor for filtering ripple voltage;

first and second rectifying diodes connecting opposite ends of the secondary winding to the inductor and capacitor;

the secondary winding including a fixed tap to divide it into two winding segments with the relative turns of the two winding segments having a 1:m winding ratio and the primary winding having a relation of n:1 to one secondary winding segment, with the winding ratios being determined by the relation;

$$m_{opt} = \frac{2}{D_A + D_B} - 1$$

in order to minimize a maximum volt second load on the output inductor over a range of input voltage at which the converter is rated; and the relative winding segment ratio is representative of a ratio of a range of voltage at the input to a voltage at the output; and whereby a turns ratio of the primary to secondary winding is further selected in accordance with the relationship $$\frac{m+1}{n} = \frac{V_0(V_A + V_B)}{V_A \cdot V_B}$$

where $D_A$ is a duty cycle sustaining a regulated output at a lowest input highest input voltage $V_B$ and being operative for limiting the peak inverse voltage across the rectifying diodes that must be sustained over the range of input voltage for which the converter is rated.

* * * * *